F. J. WOLFF.
VEHICLE SPRING.
APPLICATION FILED APR. 1, 1916.
1,327,750.
Patented Jan. 13, 1920.
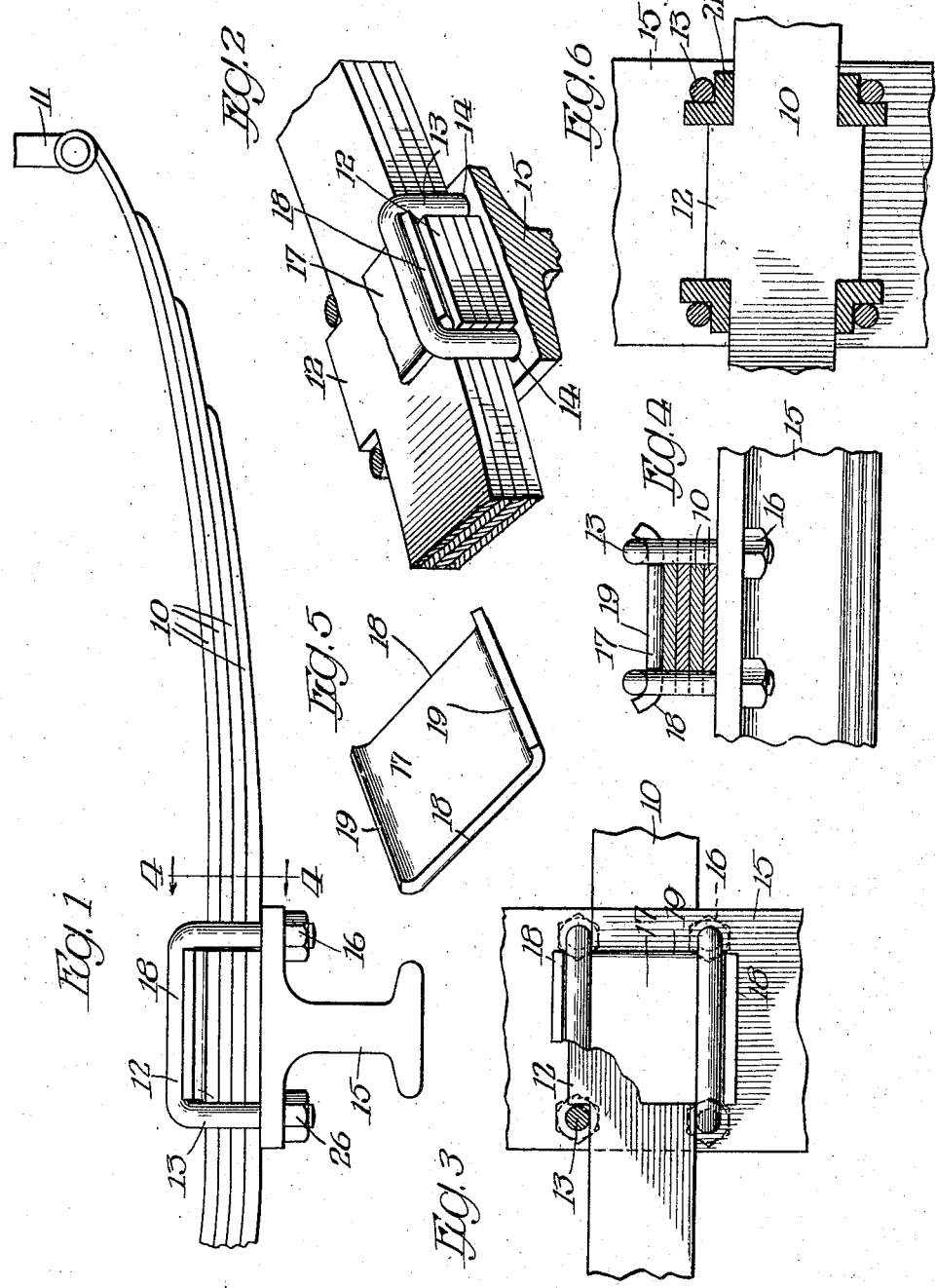

UNITED STATES PATENT OFFICE.

FRANKLYN J. WOLFF, OF CHICAGO, ILLINOIS, ASSIGNOR OF ONE-HALF TO HAROLD W. WOLFF, OF CHICAGO, ILLINOIS.

VEHICLE-SPRING.

1,327,750. Specification of Letters Patent. Patented Jan. 13, 1920.

Application filed April 1, 1916. Serial No. 88,239.

*To all whom it may concern:*

Be it known that I, FRANKLYN J. WOLFF, a citizen of the United States, residing in Chicago, in the county of Cook and State of Illinois, have invented a new and useful Improvement in Vehicle-Springs, of which the following is a specification.

This invention relates in general to springs for vehicles, and has for its object broadly, the improvement of spring construction, and the elimination of certain inherent weaknesses and defects present in devices of this character prior to my invention. Although the invention is hereinafter described as embodied in an automobile spring, it will be manifest, as the invention is better understood, that it has other and more general application, being capable of effective use in springs provided for vehicles of widely differing type and character.

Prior to my invention, it has been generally the custom to connect the leaves which together form the spring, by securing a bolt through centrally disposed apertures in the leaves. This is the location of greatest strain and the removal of any material from it consequently weakens the spring.

A principal object of this invention is to provide a vehicle spring having no perforation at the center of the leaves, and on the other hand, being stronger at this point than at any other.

A further object of this invention is the provision of a vehicle spring wherein the leaves may have a true vertical relative movement in expansion and contraction of the spring. Prior to my invention, effort has been made, of which I am aware, to strengthen the center of the spring by giving each leaf an upward central curve or offset, the offset in each leaf fitting into and over respectively, the offsets above and beneath it. The result of such construction is that the downward bending of the ends of the spring reduces the size of the openings into the offsets, each thereby pinching the offset of the leaf beneath it. This action has caused the central part of the spring to break or become ineffective by reason of its inability to utilize its natural elastic qualities. These qualities have also been hampered by the sudden curvatures given the leaves at the center to form the offsets. My present invention contemplates the provision of a spring, the leaves of which, will have undeflected and imperforate central parts.

A further object of the invention is the provision of a spring of the character described, having reinforced centers for the leaves.

A still further object of the invention, is the provision of a spring of the character described, which may be made of standard dimensions and attached effectively to vehicles having different axle requirements, and which may be either positioned as an underslung spring, or may rest upon the upper face of the axis or other vehicle part.

Other objects and advantages of the invention will be apparent as it is better understood from the following description when considered in connection with the accompanying drawing illustrating a preferred embodiment thereof.

On the drawing,

Figure 1 is a partial side elevation of a spring embodying my invention and shown connected to an automobile axle;

Fig. 2 is a partial perspective of the same with parts broken away;

Fig. 3 is a partial top plan view of the same with parts broken away;

Fig. 4 is a section taken substantially on the line 4—4 of Fig. 1;

Fig. 5 is a perspective view of the clip-connecting plate or member;

Fig. 6 is a horizontal section taken between a pair of leaves and showing the spacing members in place when the spring is used upon axles having clip requirements necessitating clips larger than the smallest size that can be used with the spring.

For the purpose of illustrating my invention, I have shown on the drawing a spring composed of a plurality of leaves (four) 10, which in accordance with the usual custom, are of varying length. The uppermost leaf supports at each end its portion of the load transmitted through a suitable element 11. Each leaf is provided with oppositely extending lateral projections 12 at the center, said projections being of like size and having similar locations so that they together constitute a projection from each side of the spring, which projections are embraced by spring clips 13. Each of these clips is of U-shaped form and is disposed over its spring projection and through apertures 14 in the I-beam axle of the vehicle. Bolts 16 are threaded on to the ends of the clips and hold the spring in place.

These clips extend in parallelism with the axis of the spring, and are prevented from lateral movement by connecting means 17, which in the present instance, consists of a plate or member disposed through the clips and passing above the spring. The ends 18 of this plate are bent upwardly, as shown in Figs. 5 and 4, to engage the clips. The edges of the plate which extend over the spring, are rounded at 19 to prevent scoring the top leaf in use.

The spring may be positioned upon axles having apertures for the clips, spaced farther apart than is normally intended for a spring of definite size. In this event angle members 21 are inserted in the angles formed by the projections and the spring proper, as indicated in Fig. 6, the dimensions of these angle members being preferably such that the angle members fit closely in the spaces between the clip legs and the adjacent faces of the projections and body proper of the spring. It will be manifest that the springs may be constructed of certain standard sizes and fitted upon axles having apertures spaced at greater distances from each other than would be required for clips used without the angle spacers just described. These spacers may be made of various dimensions to fit various conditions. A mere inversion of the spring and axle permits the spring to be underslung.

It will be manifest also, that in a spring embodying my invention, not only is no material removed at the center or the spring otherwise weakened, but on the other hand, the center is greatly strengthened through the provision of the projections upon the leaves.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:—

1. A vehicle spring comprising a plurality of superimposed leaves having projections, clips disposed alongside said leaves and embracing said projections and adapted for attachment to a vehicle axle, and a plate passing through said clips and extending above the leaves and having its ends formed to prevent separation of the clips and releasing of the leaves.

2. A vehicle spring comprising a plurality of superimposed leaves having side projections, clips disposed alongside said leaves and embracing said projections and adapted for attachment to a vehicle axle and means independent of the axle for preventing separation of the clips and releasing of the leaves.

3. A vehicle spring comprising a plurality of superimposed leaves adapted to engage upon a vehicle axle, clips disposed along the sides of said leaves and adapted for engagement with said axle, and a plate passing through said clips and extending above said leaves and having its ends formed to prevent separation of the clips and releasing of the leaves.

4. A vehicle spring comprising a plurality of superimposed leaves having projections, clips for holding said leaves in place through engagement with said projections and spacing members interposed between said clips and said projections for permitting secure fastening of the leaves in place upon an axle having openings located away from said projections.

5. A vehicle spring comprising a plurality of superimposed leaves providing angles at the sides of the leaves, clips positioned with legs adjacent said angles and spacing members interposed in said angles and engaging said clips for adapting the spring to vehicles having other axle requirements than that for which the spring is primarily constructed.

Signed in the presence of two subscribing witnesses.

FRANKLYN J. WOLFF

Witnesses:
ESTHER ABRAMS.
J. C. CARPENTER,